United States Patent
VanWingerden (10) Patent No.: US 10,412,902 B2
(45) Date of Patent: Sep. 17, 2019

(54) PLANTER, PLANTING AND METHOD OF GROWING PLANTS

(71) Applicant: Alan VanWingerden, Pompton Plains, NJ (US)

(72) Inventor: Alan VanWingerden, Pompton Plains, NJ (US)

(73) Assignee: A TO Z VAN WINGERDEN AND ASSOCIATES, LLC, Farmingdale, NY (US)

(*) Notice: Subject to any disclaimer, the term of this patent is extended or adjusted under 35 U.S.C. 154(b) by 99 days.

(21) Appl. No.: 14/098,510

(22) Filed: Dec. 5, 2013

(65) Prior Publication Data

US 2014/0090294 A1  Apr. 3, 2014

Related U.S. Application Data

(63) Continuation-in-part of application No. 13/079,229, filed on Apr. 4, 2011, now abandoned, and a continuation of application No. 11/688,069, filed on Mar. 19, 2007, now Pat. No. 7,946,078.

(51) Int. Cl.
*A01G 9/02* (2018.01)

(52) U.S. Cl.
CPC .............. *A01G 9/02* (2013.01); *A01G 9/021* (2013.01)

(58) Field of Classification Search
CPC .......... A01G 9/02; A01G 9/021; A01G 9/028; A01G 9/10; A01G 9/102; A01G 9/1073
USPC ...................... 47/66.1, 66.5, 66.6, 73, 77, 79
See application file for complete search history.

(56) References Cited

U.S. PATENT DOCUMENTS

| | | | | | |
|---|---|---|---|---|---|
| 1,775,831 | A | * | 9/1930 | Salisbury | A01G 9/021 47/65.5 |
| 1,983,806 | A | * | 12/1934 | Norman | A01G 9/1423 220/23.83 |
| 3,751,852 | A | * | 8/1973 | Schrepper | A01G 9/028 220/23.6 |
| 3,788,002 | A | * | 1/1974 | Suchka | A01G 9/104 220/510 |
| 3,830,015 | A | * | 8/1974 | Belgiorno | A01G 9/10 47/65.6 |
| 4,058,930 | A | * | 11/1977 | Miles | A01G 9/02 47/58.1 R |
| 4,173,097 | A | * | 11/1979 | Staby | A01G 9/021 47/65.5 |
| 4,495,725 | A | * | 1/1985 | Talbott | A01G 9/104 47/85 |

(Continued)

FOREIGN PATENT DOCUMENTS

| GB | 1586781 | * | 3/1981 |
|---|---|---|---|
| GB | 2098044 | * | 11/1982 |

*Primary Examiner* — David J Parsley
(74) *Attorney, Agent, or Firm* — Barbara Campbell; Cochran Freund & Young LLC (57) ABSTRACT

A plant tray having a bottom and a sidewall. The bottom has at least one prominence rising from the inner surface of the bottom. The at least two prominences have at least one elevated drainage opening that is elevated above the inner surface of the bottom. A planting is made with at least one plant that is grown in soil in the plant tray and has air pruned roots at the at least one elevated drainage opening. The medium, such as soil, is watered to allow water to initially reside in the inner surface of the bottom to a level limited by the at least one elevated drainage opening.

7 Claims, 9 Drawing Sheets

(56) References Cited

U.S. PATENT DOCUMENTS

| | | | | |
|---|---|---|---|---|
| 5,010,687 A * | 4/1991 | Hougard | ............... | A01G 27/00 47/63 |
| 5,040,330 A * | 8/1991 | Belgiorno | ............... | A01G 9/10 47/65.6 |
| 5,459,960 A * | 10/1995 | Manlove | ............... | A01G 9/10 47/65.5 |
| 5,581,936 A * | 12/1996 | Belgiorno | ............... | A01G 9/10 47/18 |
| 5,870,855 A * | 2/1999 | Hougaard | ............... | A01G 27/00 47/65.5 |
| 6,223,466 B1 * | 5/2001 | Billings | ............... | A01G 9/02 47/75 |
| 6,339,899 B1 * | 1/2002 | Lehmann | ............... | A01G 9/10 47/65.5 |
| 7,454,864 B2 * | 11/2008 | Smith | ............... | A01G 9/02 47/87 |
| 7,624,535 B2 * | 12/2009 | Schmidt | ............... | A01G 9/021 206/423 |
| 2006/0191196 A1 * | 8/2006 | Cochran | ............... | A01G 9/02 47/66.1 |

* cited by examiner

PLANTER, PLANTING AND METHOD OF GROWING PLANTS

CROSS-REFERENCES TO RELATED APPLICATIONS

This application is a continuation in part of U.S. patent application Ser. No. 13/079,229 filed on Apr. 4, 2011, which is a division of U.S. patent application Ser. No. 11/688,069, filed on Mar. 19, 2007 (now U.S. Pat. No. 7,946,078), the contents of which are hereby incorporated by reference in their entirety.

BACKGROUND OF THE INVENTION

A variety of planters exists for containing and growing plants. These planters, or plant trays, have employed containers in various shapes, sizes and forms, made of plastic, ceramics, fired clay, etc. Plants in these plant trays need to be properly watered. Excessive or insufficient watering can harm and possibly kill the plant. Systems have been devised for supplying water automatically from an external reservoir, but these systems are relatively complex and consume significant space. Plant trays often have drainage holes on their floors for reducing the possibility of excessive watering, but these holes may discharge water too quickly, allowing the plant to dry or wither. Also, puncturing holes on the floor of a plant tray can weaken the plant tray.

Plants growing in a plant tray will send roots into the medium, which includes but is not limited to, soil. The medium can also consist of peat moss, a mixture of peat moss and soil, coconut fibers, etc. It is desirable to have the roots spread relatively uniformly throughout the soil. This ensures an efficient absorption of water and nutrients. If however, the roots spread non-uniformly and become congested, they will become inefficient and unhealthy. In some cases, plants will be grown in a mesh or fabric basket having many openings. Roots reaching these openings will respond to the absence of soil by stopping their growth, exhibiting an effect known as "air pruning" One will often want to transplant a plant from one container to another to give the plant a greater volume of soil to sustain healthy growth. In some cases the original plant tray is intentionally too small and is used only for germination and initial growth. Thereafter the plant will be transplanted into an outdoor bed or into a container that may be larger and more pleasing aesthetically.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other improvements.

In accordance with the illustrative embodiments demonstrating features and advantages of the present invention, there is provided a plant tray that includes a container. The container has a bottom and at least one sidewall. The bottom has at least two prominences rising from the bottom and the at least two prominences have a concave underside and a convex upper surface. The at least two prominences have at least one elevated drainage opening that is elevated above the bottom of the plant tray. The plant tray has at least one breach between said at least two prominences. Further embodiments also include a plurality of adjacent longitudinal prominences.

Another embodiment of the present invention may include a plant tray wherein said at least two prominences have a clearance sized to cause air pruning of roots of plants reaching into said at least one drainage opening.

Another embodiment of the present invention may include a plant tray that rests upon a flat support surface, wherein said concave underside of said at least two prominences providing a water passage that is open in order to discharge water along the support surface and away from said plant tray.

Another embodiment of the present invention may include a method that employs a plant tray. The plant tray has a sidewall and a bottom. The sidewall may be annular. The bottom has at least two prominences rising from the bottom to reach an elevated drainage opening. The method includes the step of growing a plant in medium, such as soil, placed in the plant tray. Another step is watering the soil to allow water to initially reside in the bottom to a level limited by the elevated drainage opening.

In accordance with yet another embodiment of the invention, a planting is provided with a plant tray. The planting comprises a plant tray, wherein said plant tray has a container having a bottom with at least two prominences rising from the inner surface of the bottom, wherein said inner surface of the bottom is configured to retain water, and wherein said at least two prominences have a concave underside and a convex upper surface and wherein said at least two prominences have at least one elevated drainage opening that is elevated above said inner surface of said bottom; and at least one sidewall, wherein said at least one sidewall meets said bottom at a rounded corner; and at least one plant grown in soil in said plant tray and having air pruned roots at said at least one elevated drainage opening prior to transplanting to another container providing water or liquid growth solution to the medium in said plant tray; allowing excess amounts of said water or liquid growth solution to drain in from said plant tray through said elevated drainage openings while leaving said water or liquid growth solution in corridors between said at least two prominences that are lower in elevation than said drainage openings. The plants can be seeds, cuttings, whether rooted or not, or fully matured plants. The plant has air pruned roots at the at least one elevated drainage opening prior to transplanting to another container.

Another embodiment of the present invention may include a system for creating a planting comprising: a means for creating a planting using a plant tray having a bottom, at least one sidewall, at least two prominences rising from the bottom, at least one elevated drainage opening located on the prominence; a means for planting at least one plant, whether the plant is from seeds, rooted cuttings, unrooted cuttings, or a fully matured plant; and a means of watering said planting so that at least one said plant in said plant tray develops air pruned roots at the at least one elevated drainage opening.

Another embodiment of the present invention includes a method of growing at least one plant in a plant tray, said method comprising the steps of: growing at least one plant in a medium placed in a plant tray, wherein the plant tray has a container having a bottom with at least two prominences rising from the inner surface of the bottom, wherein said inner surface of the bottom is configured to retain water, and wherein said at least two prominences have a concave underside and a convex upper surface and wherein said at least two prominences have at least one elevated drainage opening that is elevated above said inner surface of said bottom; and at least one sidewall, wherein said at least one sidewall meets said bottom at a rounded corner; and providing water or liquid growth solution to the medium in said plant tray; allowing excess amounts of said water or liquid growth solution to drain from said plant tray through said elevated drainage openings while leaving said water or liquid growth solution in corridors between said at least two prominences that are lower in elevation than said drainage openings.

Another embodiment of the present invention provides for breeches between adjacent prominences or ridges in a row that provide transverse connections between adjacent longitudinal corridors.

In addition to the example aspects and embodiments described above, further aspects and embodiments will become apparent by reference to the drawings and by study of the following descriptions, any one or all of which are within the invention. The summary above is a list of example implementations, not a limiting statement of the scope of one or more embodiments the invention.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 1b is a perspective view of a plant tray in accordance with an embodiment of the present invention. FIG. 1b is the same figure as FIG. 1a, but with different descriptors of the plant tray;

FIG. 1c is a perspective view of a plant tray in accordance with an embodiment of the present invention. FIG. 1c is the same figure as FIGS. 1a and 1b, but with different descriptors of the plant tray;

DETAILED DESCRIPTION

By employing the apparatus and methods of the foregoing type, an improved horticultural technique is achieved with an improved plant tray. In a disclosed embodiment, the bottom of a plant tray is not completely flat. Instead, the bottom will have multiple elevated plateaus, prominences, or ridges rising above the bottom. The disclosed plateaus, ridges, or prominences reinforce the bottom of the plant tray.

In some disclosed embodiments, the prominences are in the form of multiple prominences or ridges that can be arranged in various patterns: e.g., parallel, staggered, radial, perpendicular, etc. The plant tray can contain a plurality of elevated prominences or ridges that are separated by corridors and breeches. The breeches are located between adjacent prominences or corridors in a row and provide transverse connections between adjacent longitudinal corridors. The prominences or ridges have one or more openings for draining water to a hollow space below. This hollow space may form a channel allowing drainage to discharge past the perimeter of the plant tray.

In addition, the drainage openings that are elevated will feed a hollow space that is sufficiently large to not only ensure efficient discharge of drainage, but also ensure that an airspace exists immediately below the drainage opening. Consequently, roots reaching these drainage openings will encounter an airspace that stops further growth and causes air pruning Consequently, the roots will not be locked into the drainage openings and therefore the plant and soil can be easily removed from the plant tray for the purpose of transplanting. One skilled in the art understands that soil is a medium for the roots and other mediums that may be employed for example are peat moss, a mixture of peat moss and soil, and coconut fibers, and mixtures of these mediums. Furthermore, the drainage openings in these prominences will be elevated from the bottom of the plant tray to allow a residual of water to remain in the bottom below the opening. This effectively provides a reservoir of water that is spatially limited to avoid keeping the majority of the soil saturated. Water in this shallow reservoir will be drawn upwardly by the drier soil above. Any water that rises to the level of the drainage openings will be discharged as an excess.

Disclosed embodiments will have features that enhance the distribution of roots growing in the soil of the plant tray. For example, a gently rounded corner will exist at the transition between the side and bottom of the plant tray. This rounding will tend to re-orient roots descending toward the bottom into a horizontal growth direction. This tends to send roots inwardly, instead of following a circumferential path around the perimeter of the plant tray where the roots will tend to cluster and become congested. Also, disclosed embodiments will have corridors promoting root growth in a direction away from the sidewalls of the plant tray. Specifically, roots that descend near the sidewall will naturally enter these corridors, which will then direct the roots inwardly. In some cases the plant tray will have baffles placed at the corner of the plant tray near its bottom to block roots from growing in a circumferential direction.

Figure 1A:
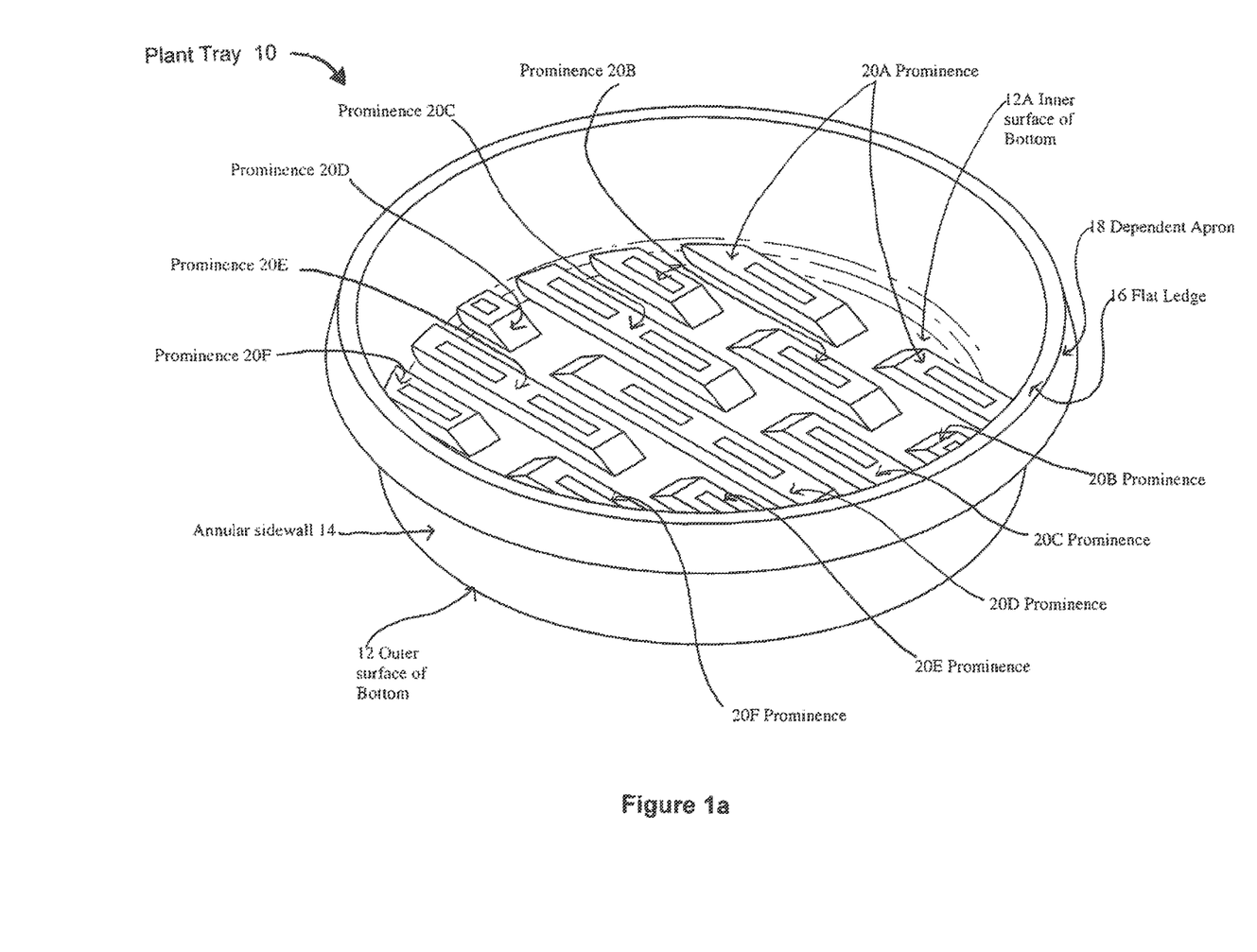
FIG. 1a is a perspective view of a plant tray in accordance with an embodiment of the present invention.

Referring to FIG. 1a, a plant tray 10 has an outer surface of the bottom 12, and an inner surface of the bottom 12A. Annular sidewall 14 extends upward from the perimeter of the inner surface of the bottom 12A and the outer surface of the bottom 12. The top of the annular sidewall 14 is rolled to form a flat ledge 16 with a dependent apron 18 extending downwardly at a small diverging angle. Flat ledge 16 and dependent apron 18 stiffens and strengthens the rim of annular sidewall 14. At least two, but there may be a plurality of prominences or ridges 20A, 20B, 20C, 20D, 20E, 20F, and 20G (20G is shown in FIG. 2b but not shown in FIG. 1a), rising from the inner surface of the bottom 12A. One skilled in the art would realize that while there can be at least two prominences, a plurality of prominences may exist, such as three, four, five, six, seven, eight, nine, ten, eleven, twelve, thirteen, fourteen, fifteen, sixteen, seventeen, eighteen, nineteen, and so on. The prominences or ridges are concave on the underside and convex on the upper surface. One skilled in the art would realize that while the prominences are shown as rectangular, the prominences may be formed in other shapes, such as being curved.

Figure 1B:
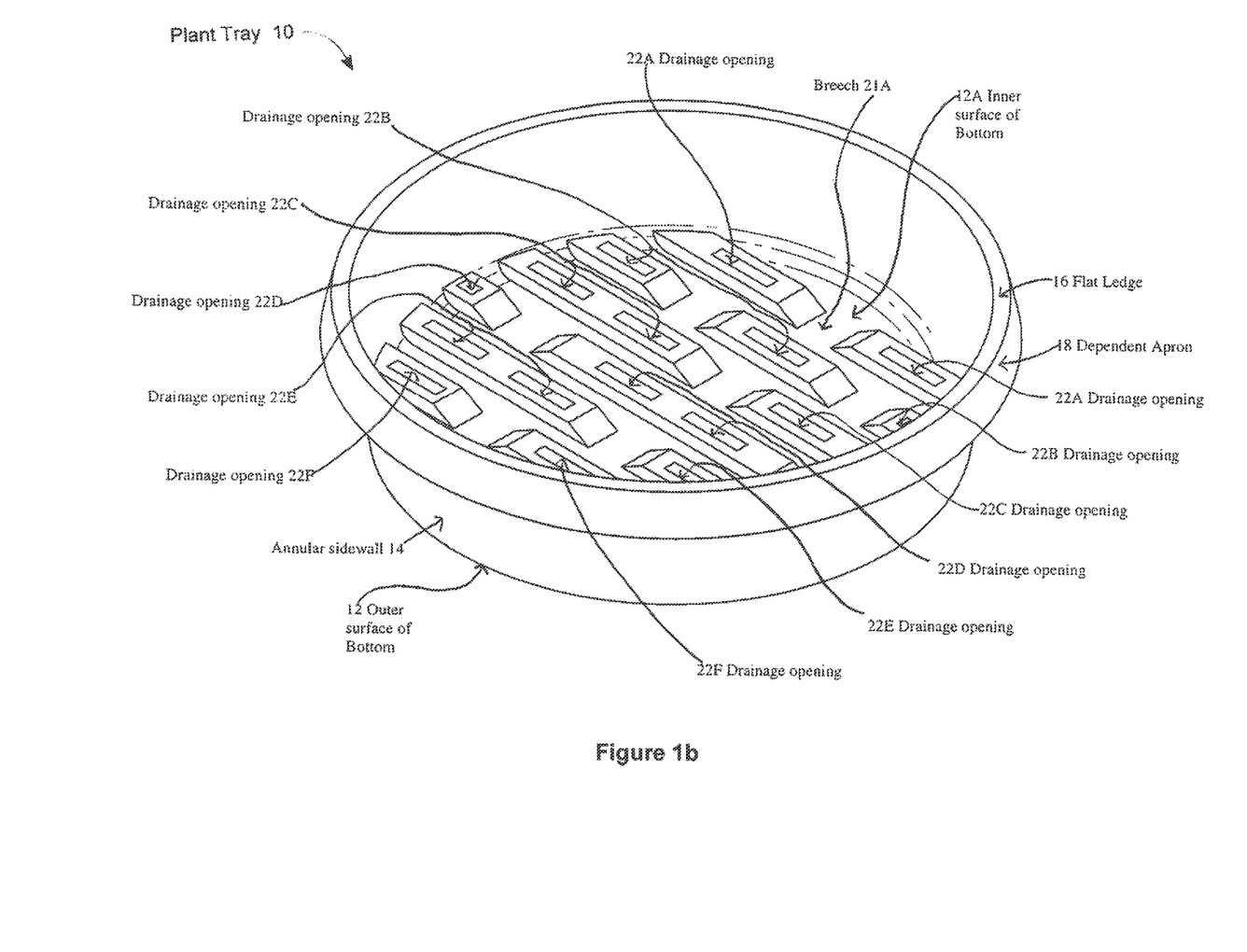

Referring to FIG. 1b, a plant tray 10 has ridges or prominences 20A through 20G (not labeled in FIG. 1b, but shown in FIG. 1a). The inner surface of the bottom 12A has drainage openings 22A, 22B, 22C, 22D, 22E, 22F and 22G (22G is not shown in FIG. 1b but shown in FIG. 2b) that are elevated and formed atop the prominences or ridges 20A, 20B, 20C, 20D, 20E, 20F and 20G, respectively. One skilled in the art would realize that any different number of drainage openings could be used. Each of the drainage openings, 22A-22G, are elongated slots formed at a higher elevation than the inner surface of the bottom 12A and the outer surface of the bottom 12, although one skills in the art may employ drainage openings with different shapes instead as another embodiment of the present invention. Prominences or ridges 20A-20G may have at least one drainage opening.

Figure 1C:
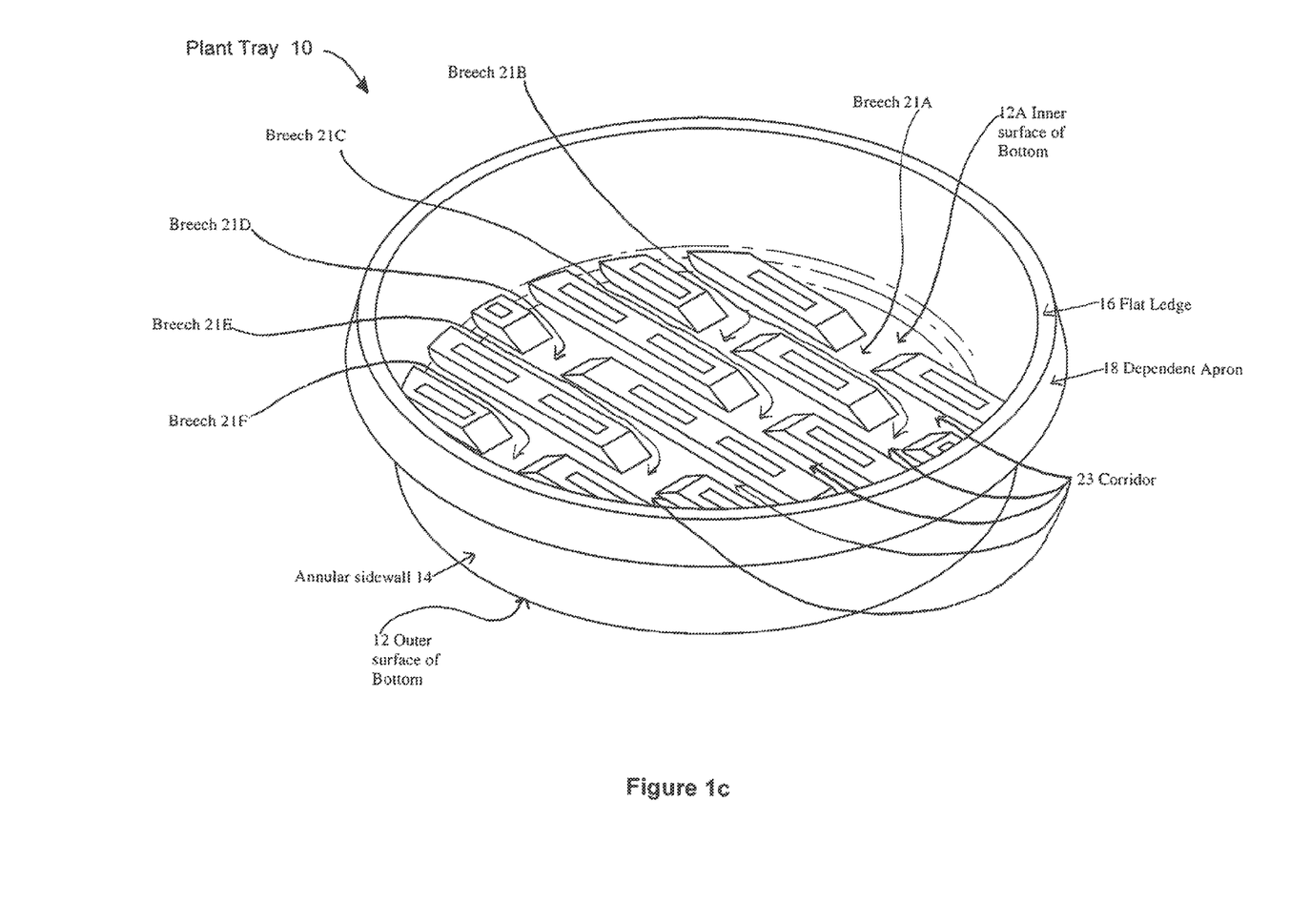

Referring to FIG. 1c, a plant tray 10 has ridges or prominences 20A through 20G (20G not labeled in FIG. 1c, but shown in FIG. 1a) which are interrupted by one or more breaches; namely, breaches 21A through 21G (21G not shown in FIG. 1c but shown in FIG. 2b), respectively. The breaches are located between prominences and provide a transverse connection between the longitudinal corridors. Breach 21G is not shown in FIG. 1c but show in FIG. 2b. Breaches 21A-21G form valleys with banks that slope down from the top of each prominence or ridge 20A-20G to the inner surface of the bottom 12A. Prominence or ridges 20A, 20C, 20E, and 20G are each formed having a single breach 21A, 21C, 21E, and 21G, respectively. Breach 21G is not shown in FIG. 1c but is shown in FIG. 2b. Prominences or ridges 20B, 20D, and 20F are each flanked with a pair of breaches 21B, 21D, and 21F, respectively. Additionally, ridges or prominences 20A through 20G (not labeled in FIG. 1c, but shown in FIG. 1a) are separated by corridors 23. One skilled in the art would know that an embodiment of the present invention may employ any number of corridors.

Figure 2A:
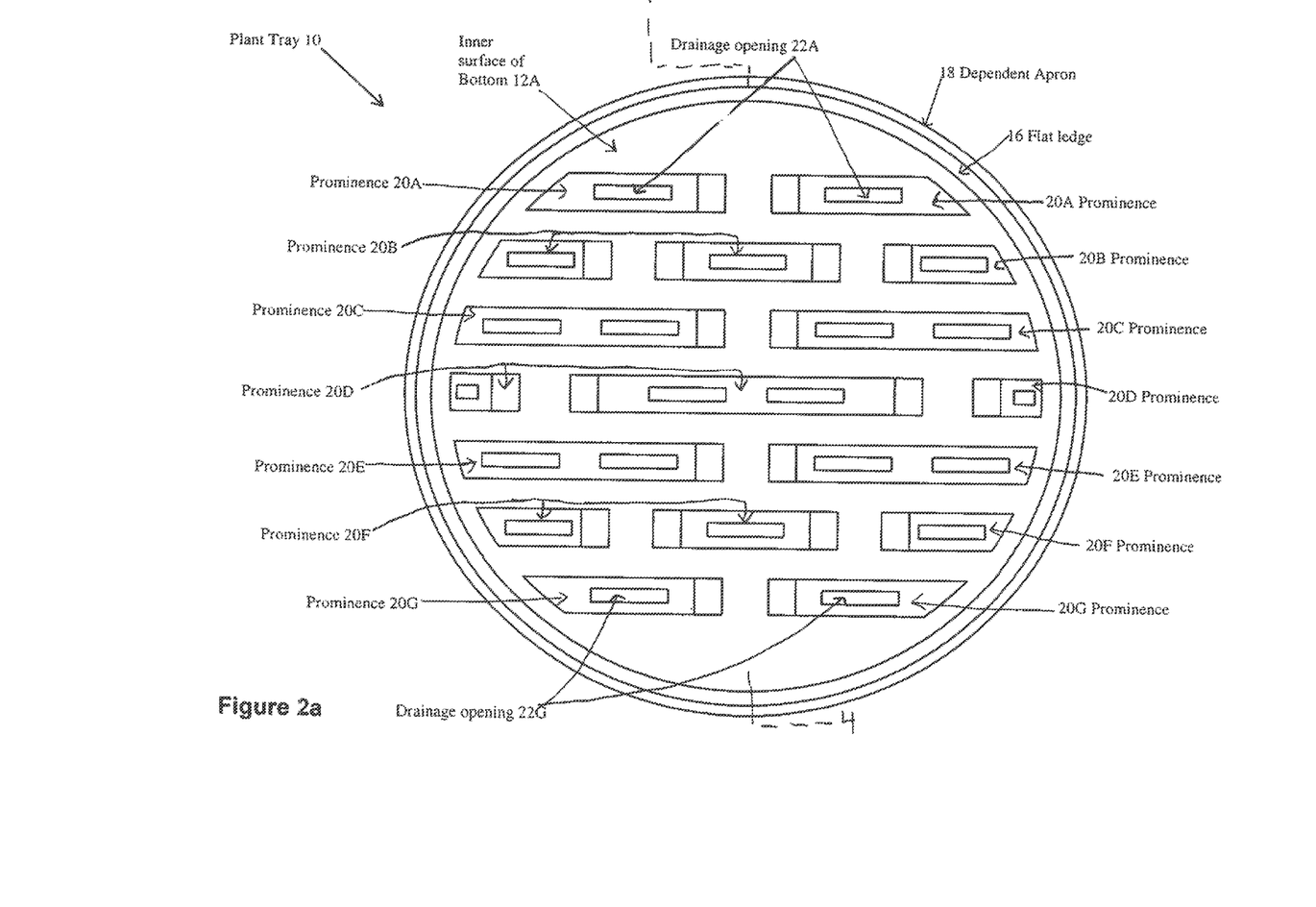
FIG. 2a is a plan view of the plant tray of FIGS. 1a-1c.
Figure 2B:
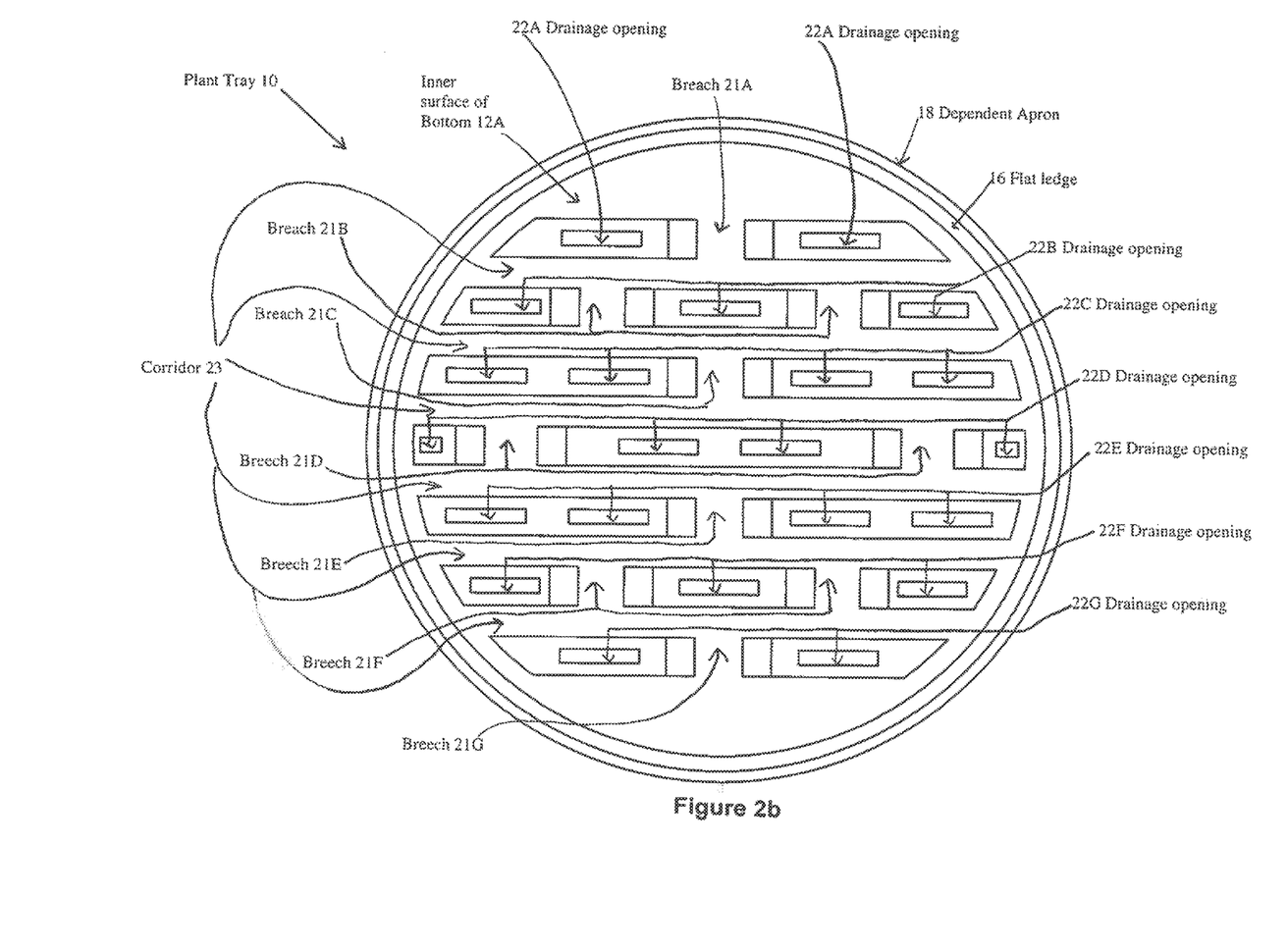
FIG. 2b is a plan view of the plant tray of FIGS. 1a-1c.

Referring to FIG. 2a, a plant tray 10 is shown having ridges or prominences 20A-20G, the inner surface of bottom 12A, the dependent apron 18, and the flat ledge 16.

Referring to FIG. 2b, a plant tray 10 is shown having ridges or prominences 20A-20G (not labeled in FIG. 2b, but shown in FIG. 2a) which are interrupted by one or more breaches; namely, breaches 21A through 21G, respectively. Breaches 21A-21G form valleys with banks that slope down from the top of each prominence or ridge 20A-20G to the inner surface of the bottom 12A. Prominence or ridges 20A, 20C, 20E, and 20G are each formed having a single breach 21A, 21C, 21E, and 21G, respectively. Breach 21G is not shown in FIG. 1c but is shown in FIG. 2b. Prominences or ridges 20B, 20D, and 20F are each flanked with a pair of breaches 21B, 21D, and 21F, respectively. Additionally, ridges or prominences 20A through 20G (not labeled in FIG. 2b but labeled in FIG. 2a) are separated by corridors 23. The inner surface of the bottom 12A has drainage openings 22A, 22B, 22C, 22D, 22E, 22F and 22G that are elevated and formed atop the prominences or ridges 20A, 20B, 20C, 20D, 20E, 20F and 20G, respectively. Each of the drainage openings, 22A-22G, are elongated slots formed at a higher elevation than the inner surface of the bottom 12A and the outer surface of the bottom 12, although drainage openings with different shapes may be employed instead as another embodiment. Prominences or ridges 20A-20G may have at least one drainage opening. Prominences or ridges form seven parallel rows with 5 corridors 23 running between them along the inner surface of the bottom 12A. While seven parallel rows are shown, any number of rows is contemplated. Additionally, while 5 corridors are shown, any number of corridors is contemplated. Prominences or ridges 20A-20G are designed to provide a desired stiffness and strength to plant tray 10.

Figure 3:
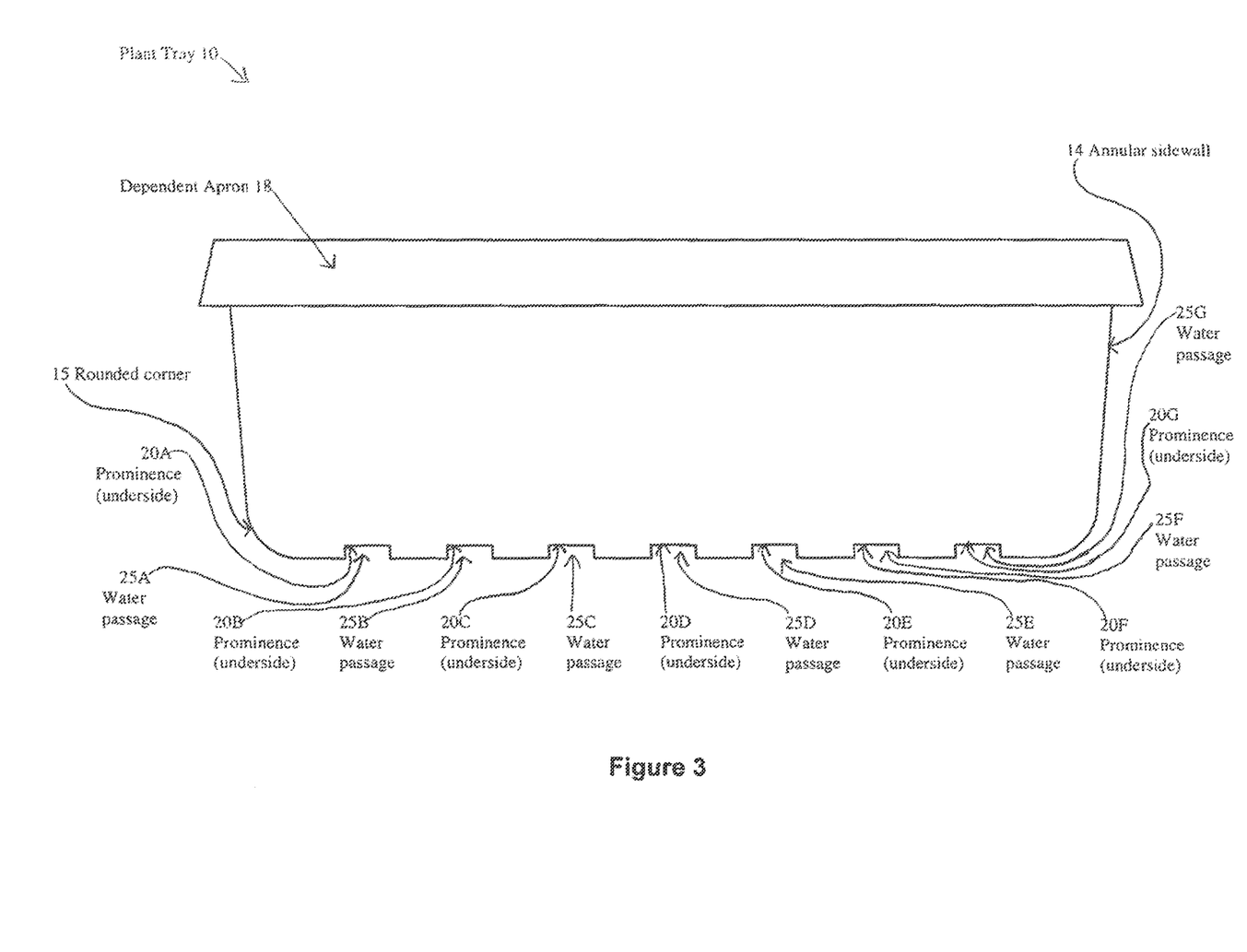
FIG. 3 is a side elevation view of the plant tray of FIGS. 1a-1c.

Referring to FIG. 3, which is a cross-section of line 4-4 of FIG. 2a, a plant tray is shown having a dependent apron 18, an annular sidewall 14, and a rounded corner 15. Drainage openings 22A-22G (not shown in FIG. 3, but shown in FIG. 2b) provide a path for excess water to drain from soil that may be placed in the plant tray 10 while still retaining soil in plant tray 10. As shown in FIG. 3, the concave underside of ridges or prominences 20A-20G form water passages 25A, 25B, 25C, 25D, 25E, 25F and 25G that are open at either end and provide clearance below drainage openings 22A-22G (22G not shown in FIG. 3, but shown in FIG. 2b), which clearance is useful for producing the air pruning described hereinafter.

Each of the prominences or ridges 20A-20G (not shown in FIG. 3, but shown in FIG. 2b), have a top, bottom, and at least one sidewall and have an inverted U-shaped cross section presenting substantially two opposing sheer faces descending from a relatively flat plateau. Prominences or ridges 20A-20G (not shown in FIG. 3, but shown in FIG. 2b) are shell-like and have a uniform thickness approximately equal to that of the inner surface of the bottom 12A. Prominences or ridges 20A-20G (not shown in FIG. 3, but shown in FIG. 2b) are referred to as prominences that are convex above the inner surface of the bottom 12A of the plant tray 10 and concave below the outer surface of the bottom 12.

While prominences or ridges may have an inverted U-shaped cross section giving the prominences or ridges a substantially rectangular shape, in other embodiments, one skilled in the art may contemplate that the prominences or ridges may have any one of numerous cross sections (for example, triangular or semicircular).

As shown in FIG. 3, annular sidewall 14 extends upward from the perimeter of the inner surface of the bottom 12A and the outer surface of the bottom 12 substantially perpendicular and with a rounded corner 15. Some prominences or ridges such as 20A and 20G (as shown in FIG. 2a) intersect annular sidewall 14. The top of the annular sidewall 14 is rolled to form a flat ledge 16 with a dependent apron 18 extending downwardly at a small diverging angle. Flat ledge 16 and dependent apron 18 stiffens and strengthens the rim of annular sidewall 14. In one embodiment of the present invention, plant tray 10 has an approximate diameter of 11 inches (28 cm) and an approximate height of 3 inches (7.6 cm). In other embodiments of the present invention where a shallow plant tray is desired, plant trays are anticipated with diameters (or overall widths) in the range of 4 to 24 inches (10 to 61 cm) and heights in the range of 2 to 4 inches (5.1 to 10.2 cm) are contemplated. Further, embodiments are contemplated with plant trays that are 2 inches (5.1 cm) across and 1 inch (2.5 cm) deep, and these smaller plant trays can be provided as a single discrete plant trays or multiple plant trays that are integrally connected together in a single flat or plant trays. In general, the overall dimensions and size of a plant tray can be chosen to accommodate specific plants or the preferences of the user.

As described further hereinafter, the rounded corner 15 tends to divert descending roots inwardly. The larger the radius of curvature of corner 15, the greater its capacity to direct roots inwardly and avoid root binding. Alternatively, an excessively large radius of curvature will reduce the available area for the inner surface of the bottom 12A and the outer surface of the bottom 12 and prominences or ridges 20A-20G (only undersurface shown in FIG. 3; top surface of prominences or ridges shown in FIG. 2*a*). One embodiment includes rounding of corner 15 that causes a reduction of less than 35% in the area available for both the inner surface of the bottom 12A and the outer surface of the bottom 12 and prominences or ridges 20A-20G (only undersurface shown in FIG. 3; top surface of prominences or ridges shown in FIG. 2*a*). As an example, a plant tray having an overall diameter of 8 inches (20 cm) may, because of corner rounding, have available for the bottom (comprised of the inner surface of the bottom 12A and the outer surface of the bottom 12) and prominences or ridges, a floor area that is 6.5 inches (16.5 cm) in diameter (i.e. a radius of curvature of 0.75 inch (19 mm) and a floor reduction of 34%).

Plant tray 10 can be made of biodegradable material such as compressed compost, pressed peat, or cardboard. Alternatively, plant tray 10 may be made of injected molded plastic forming a thin, low cost, disposable plant tray. One skilled in the art may employ different types or grades of plastic such as polyethylene terephthalate, high density polyethylene, low density polyethylene, polypropylene, polystyrene, or polycarbonate. In addition, plant tray 10 may be formed using other material, such as sheet metal, clay, etc. Plant tray 10 has a shell-like structure and is designed so that empty trays can be nested and stacked.

Plant tray 10 is shown as circular but may have other outlines, such as outlines that are square, rectangular, polygonal, lunate, oval, elliptical, etc.

Root Entanglement

To facilitate an understanding of the principles associated with the foregoing apparatus, its operation will be briefly described in connection with the embodiments of FIGS. 1-4.

Figure 4:
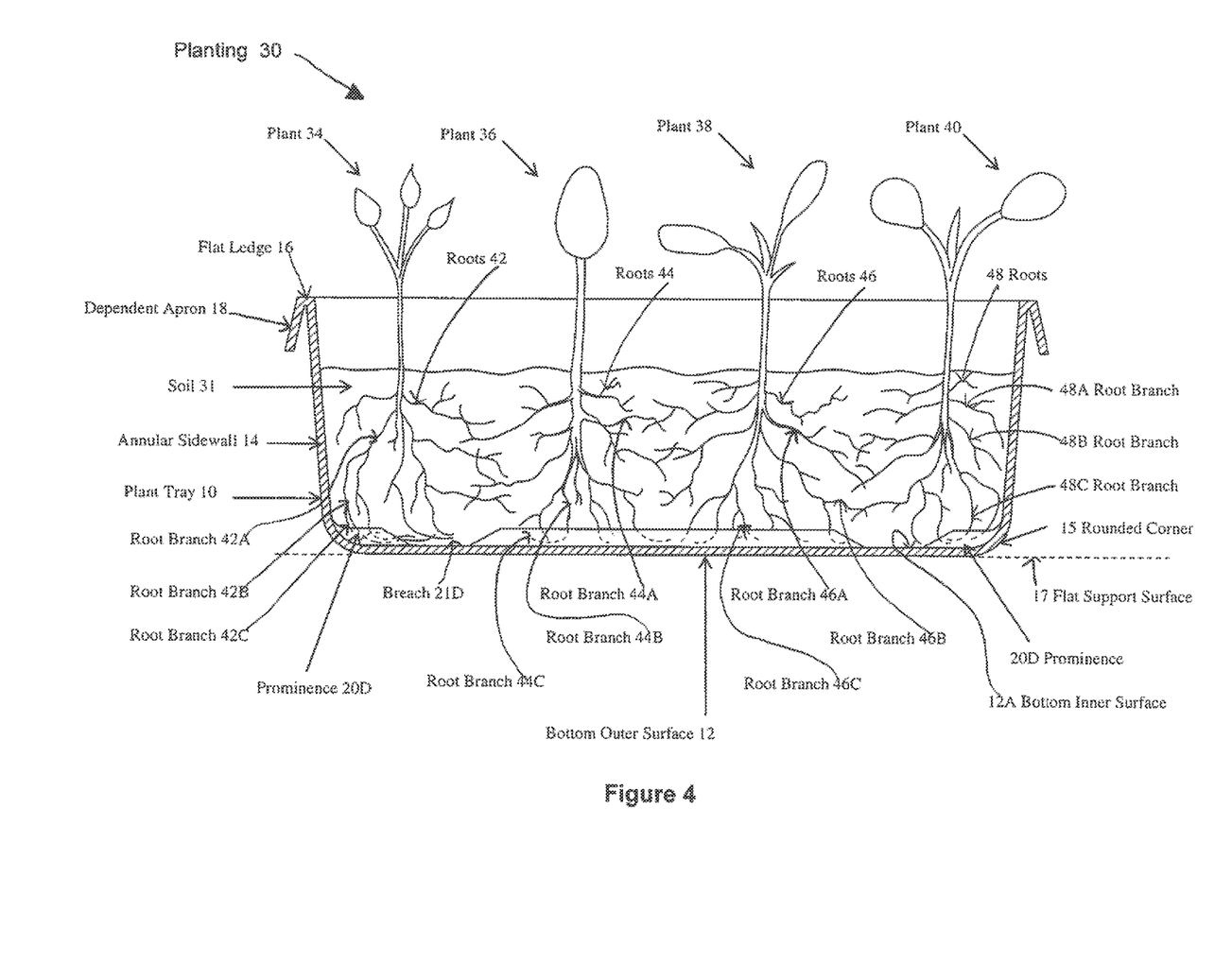
FIG. 4 is a cross-sectional view of the plant tray of FIG. 2a taken along line 4-4 and shown containing soil and plants to form a planting in accordance with a novel method, also in accordance with embodiments of the present invention.

Referring to FIG. 4, a planting is comprised of a plant tray 10, which is filled with soil 31. Planted side-by-side are four distinct plants 34, 36, 38 and 40. It will be understood to one skilled in the art that in other cases a different number of plants and a different number of species may be grown in plant tray 10. Alternatively, plant tray 10 can contain at least one plant of the same species. Also, these plants may be distributed in any desired pattern. In addition, plants may be introduced into soil 31 as seeds, cuttings whether rooted or unrooted, or partially or fully matured plants.

When soil 31 is watered, the water will tend to descend, eventually reaching the inner surface of the bottom 12A. If soil 31 is watered excessively, water will pool along the inner surface of the bottom 12A and rise above prominences or ridges 20A-20G (not shown in FIG. 4 but shown in FIG. 2*a*). The excessive water will then drain through openings 22A-22G (not shown in FIG. 4, but shown in FIG. 2*b*). Drainage openings 22A-22G (not shown in FIG. 4, but shown in FIG. 2*b*) can be on the distal ends of their respective prominences or ridges 20A-20G (not shown in FIG. 4 but shown in FIG. 2*a*), or located anywhere else on the top of the prominences and are open so that water can easily pass along flat support surface 17 and beyond the perimeter of plant tray 10.

As excessive water is thus discharged, water will subside initially to a level just below the top of prominences or ridges 20A-20G (not shown in FIG. 4 but shown in FIG. 2*a*), effectively leaving behind a reservoir of water. This limited reservoir will act as a water supply that allows longer time intervals to elapse between waterings without risking injury to the plantings. This water will be wicked upwardly into soil 31. The elevation of drainage openings 22A-22G (all drainage openings shown in FIG. 2*b*; drainage openings 22A-22F shown in FIG. 1*a*) is selected to control the quantity of water located below these openings and keeps the water at the level of the water passage before the water is drawn up the soil and through the drainage hole openings. For example, for plant tray 10, one embodiment of the height of prominences or ridges may be 0.25 inch (6 mm) but the height can be different in other embodiments depending upon the desired volume of the water reservoir. The height will be the chosen depending upon the size of the container and the characteristics of the plants to be grown therein. The height and the volume of the reservoir should not be so much as to risk rotting of the roots. On the other hand, relatively low prominences or ridges will not easily discharge water and therefore air pruning will not occur. In alternative embodiments, sufficient pruning of the roots of plants will be achieved when the elevation of drainage openings 22A-22G (not shown in FIG. 4, but shown in FIG. 2*b*) are in the range of for example, 0.125 inch to 1.0 inch (0.3 mm to 25 mm).

It will be noted that for purposes of illustration, plants 34, 36, 38 and 40 have roots 42, 44, 46 and 48, respectively, that are beginning to become entangled. (For the advantages flowing from root entanglement, see for example, U.S. Pat. No. 7,946,078.) For plant 34 for example, its root branch 42A has descended along sidewall 14 and has reached corner 15. Being rounded, corner 15 has diverted root branch 42A inwardly. Also, root branch 42A will be constrained in the corridor 23 (not shown in FIG. 4, but shown in FIG. 2*b*) between prominences ridges 20D and 20E (not shown in FIG. 4 but shown in FIG. 2*a*) and will therefore be started in a direction across inner surface of the bottom 12A. In principle, root branch 42A may veer to the left through breach 21D. However, root branch 42A will not be traveling circumferentially in rounded corner 15 and will therefore not become "root bound" with other similarly directed roots. Similar remarks apply to root branch 42B. Also, root branch 42C has descended to the corridor formed between ridges 20D and 20C and will likewise avoid becoming root bound.

For plant 40, root branches 48A and 48B are following a course similar to previously mentioned root branches 42A and 42C, respectively.

For plant 36, root branch 44A has descended into the corridor formed between ridges 20D and 20E (not shown in FIG. 4 but shown in FIG. 2*a*). While root branch 44A has been diverted by the inner surface of the bottom 12A away from the center of plant tray 10, root branch 44A will not be traveling circumferentially in rounded corner 15 and will therefore avoid becoming root bound. Root branch 44B has descended into the region around breach 21C (not shown in FIG. 4 but shown in FIG. 2*b*) and has been diverted into the corridor between prominences or ridges 20C (not shown in FIG. 4, but shown in FIG. 2*a*) and 20D, although in some cases this root branch could have passed through breach 21C (not shown in FIG. 4 but shown in FIG. 2*b*) and travelled in the corridor between prominences or ridges 20B and 20C (not shown in FIG. 4 but shown in FIG. 2*a*). Root branches 46A and 46B of plant 38 are being diverted along a course similar to root branches 44A and 44B, respectively.

Root branch 44C has descended into drainage opening 22D (not shown in FIG. 4 but shown in FIG. 2*b*) of prominence or ridge 20D (not shown in FIG. 4 but shown in FIG. 2*a*). However, root branch 44C does not pass through drainage opening 22D (not shown in FIG. 4 but shown in FIG. 2*b*) due to air pruning. Likewise root branch 46C has descended into the other opening 22D (not shown in FIG. 4 but shown in FIG. 2*b*) of prominence or ridge 20D (not shown in FIG. 4 but shown in FIG. 2*a*) to experience air pruning. This air pruning occurs because the space underneath drainage opening 22D (not shown in FIG. 4 but shown in FIG. 2b) is sufficient to allow discharged water to subside so that root branches 44C and 46C will reach open air and stop growing downwardly. Accordingly, if one wishes to transplant the plants 34-40, they can be easily removed as a group because no roots will have locked themselves into any of the drainage openings 22A-22G (not shown in FIG. 4 but shown in FIG. 2b).

Figure 5:
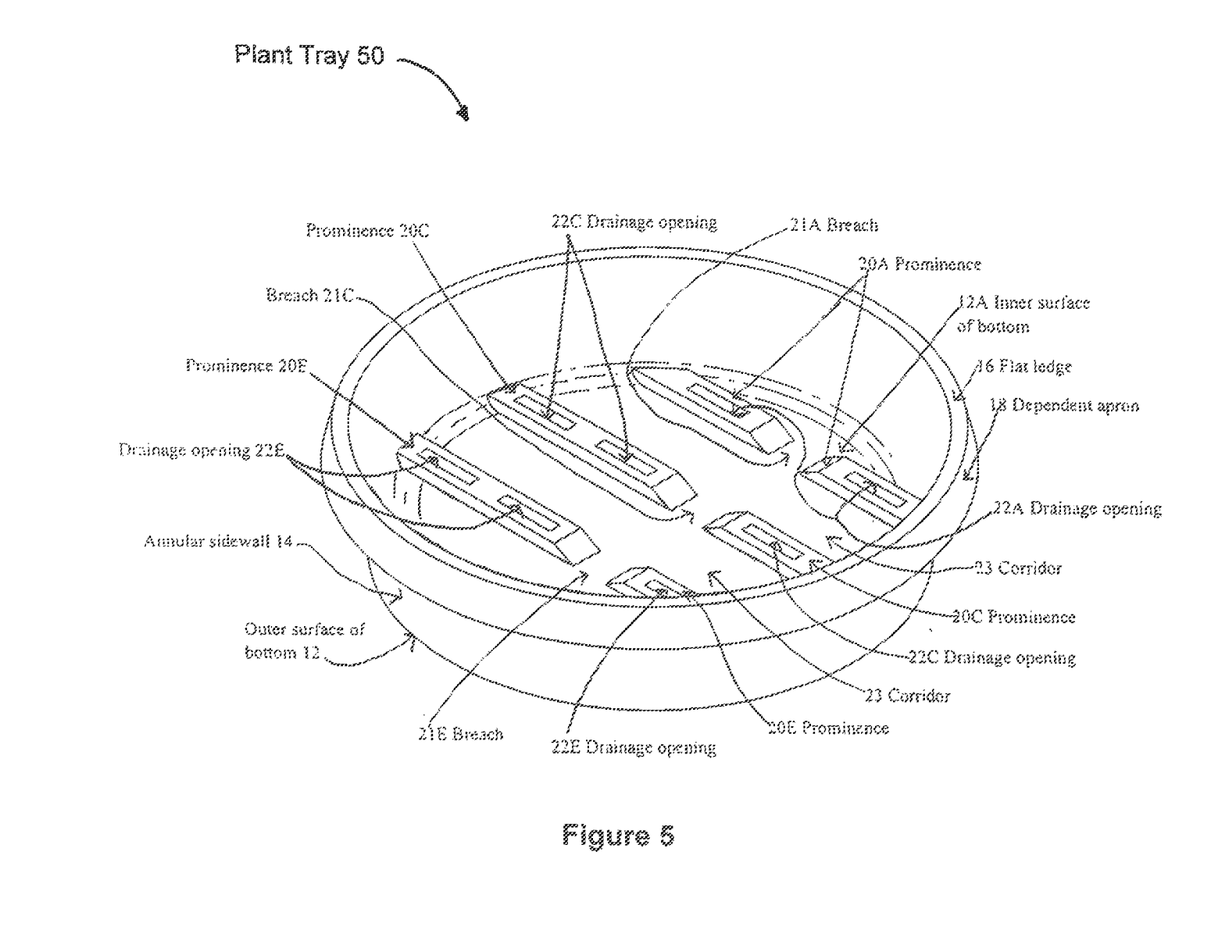
FIG. 5 is a perspective view of a plant tray in accordance with an embodiment of the present invention.

Referring to FIG. 5 is a perspective view of an embodiment of the plant tray of the present invention. Plant tray 50 has prominences 20A, 20C, and 20E. Prominences 20A, 20C, and 20E rise above the inner surface of the bottom 12A of plant tray 50. Prominences 20A, 20C, and 20E have drainage openings 22A, 22C, and 22E, respectively. Breaches 21A, 21C, and 21E are located between Prominences 20A, 20C, and 20E. Corridors 23 run between prominences 20A, 20C, and 20E. The inner surface of the bottom, the outer surface of the bottom, the annular sidewall, the dependent apron, the flat ledge, the prominences, the breaches, the drainage openings, and the corridors shown in FIG. 5 were previously described in FIGS. 1-4, except that a different quantity of prominences, drainage openings, corridors, and breaches are illustrated as another embodiment, as previously noted, one skilled in the art could vary these components as another embodiment of the invention.

Figure 6:
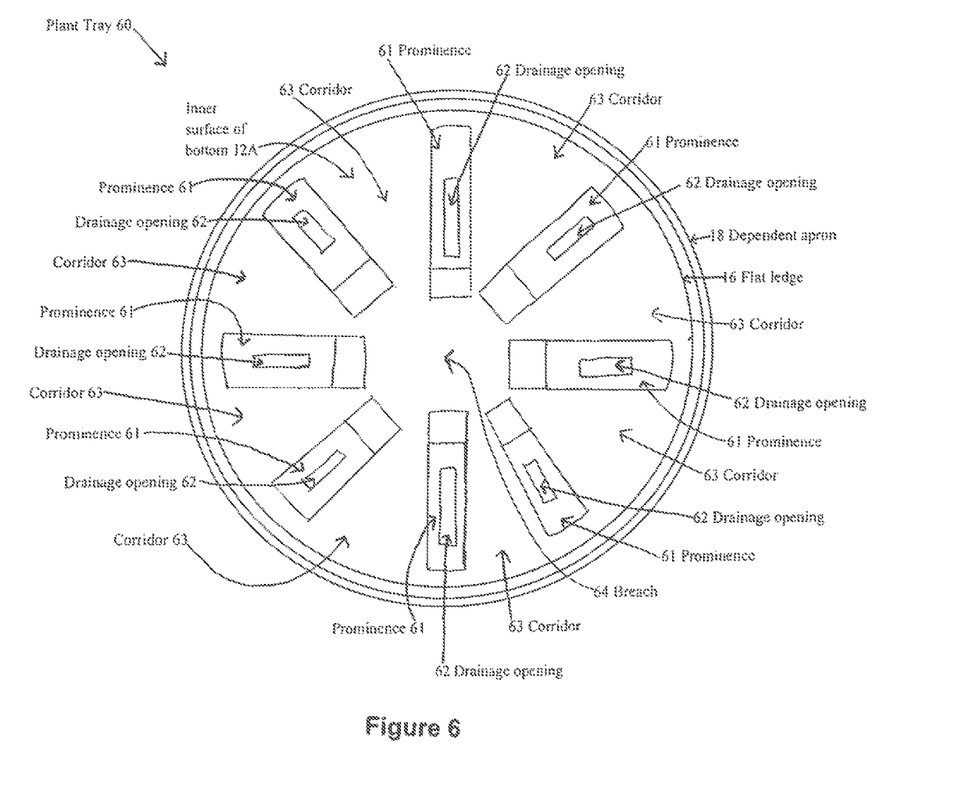
FIG. 6 is a plan view of a plant tray in accordance with an embodiment of the present invention.

Referring to FIG. 6 is a plan view of an embodiment of the plant tray of the present invention. Plant tray 60 has eight prominences 61 that rise above the inner surface of the bottom 12A of plant tray 60. One skilled in the art would know that any number of prominences could be employed in this embodiment. Prominences 61 have at least one drainage opening 62 located at the top of the prominences 61. Breach 64 is the space located in the middle of the tray between the distal ends of the prominences 61. Corridors 23 are located between prominences 61 that are arranges in a radial pattern. The inner surface of the bottom, the annular sidewall, the dependent apron, the flat ledge, the prominences, the breaches, the drainage openings, and the corridors shown in FIG. 6 were previously described in FIGS. 1-4, except that a different quantity of prominences, drainage openings, corridors, and breaches are illustrated as another embodiment, as previously noted, one skilled in the art could vary these components as another embodiment of the invention.

It is appreciated that various modifications may be implemented with respect to the above described embodiments. The foregoing containers may be molded from plastic or may be made from other materials such as metal, ceramics wood, composite materials, etc. Also, the foregoing prominences or ridges can have a variety of shapes and need not have the same height. In addition, while most of the area of the floor of the foregoing containers is not occupied by prominences, in other embodiments most of the floor can be so occupied. Also, while the foregoing disclosed containers having a single growing compartment, in some embodiments a single plant tray may have multiple containers or compartments. In some embodiments, the prominences or ridges may be solid and will simply have throughbores to allow drainage to the underside of the plant tray. In some cases, embossments on the underside of the plant tray container can raise it to allow water to discharge away from the container. Alternatively, the container may be placed in a dish or plate that has embossments that elevate the plant tray. In still other cases, the plant tray may be placed on a rack or table with openings that allow immediate downward discharge of water without the need for water to seep across the bottom of the plant tray. Also, while elevated drainage openings are illustrated, some embodiments may use drainage openings in the lower surface of the plant tray either as a supplementary way or exclusive way of draining excess water from the plant tray.

Many modifications and variations of the present invention are possible in light of the above teachings. It is therefore to be understood that within the scope of the appended claims, the invention may be practiced otherwise than as specifically described.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A plant tray comprising:
a unitary tray having a unitary enclosure enclosed by a continuous truncated cone-shaped sidewall meeting an impermeable floor at a rounded corner and having a dependent apron and a flat ledge, having an open top, a plurality of longitudinally aligned hollow prominences being arranged in a plurality of rows rising from the inner surface of the tray floor and the prominences being separated by transverse breaches and longitudinal corridors, wherein a portion of the plurality of peripheral prominences engage said sidewall, wherein at least some of the plurality of prominences have at least one elevated drainage opening located on a top surface of the prominences so as to retain water in the tray while allowing for drainage of excess water through the elevated drainage opening; and
wherein the tray is adapted to receive medium and one or more cuttings, plants or seeds or combinations thereof and wherein the medium engages at least the impermeable floor; and
wherein the tray is adapted to rest on a relatively flat support surface, and wherein the underside of the plurality of prominences provide water passages that enable discharge of water along the support surface and away from the tray; and
wherein any resulting plant or plants produced from one or more cuttings, plants, or seeds or combination thereof placed in the tray develops air pruned roots that are air pruned at the interface of the drainage openings such that the resulting plant or plants are not bound to the tray by its roots and wherein the rounded corner facilitates the resulting plant or plants with medium to be removed as a group.

2. A planting comprising:
a unitary tray having a unitary enclosure enclosed by a continuous truncated cone-shaped sidewall meeting an impermeable floor at a rounded corner and having a dependent apron and a flat ledge, having an open top, a plurality of longitudinally aligned hollow prominences being arranged in a plurality of rows rising from the inner surface of the tray floor and the prominences being separated by transverse breaches and longitudinal corridors, wherein a portion of the plurality of peripheral prominences engage the sidewall, wherein at least some of said plurality of prominences have at least one elevated drainage opening being located a top surface of the prominences to retain water but allow for drainage of excess water through the elevated drainage opening;

providing medium to the tray and wherein the medium engages at least the impermeable floor;

providing one or more cuttings, plants or seeds or combinations thereof to the medium in the tray;

providing water or liquid growth solution to the tray;

allowing excess amounts of the water or liquid growth solution to drain the tray through the elevated drainage openings while retaining a portion of the water or liquid growth solution within the floor of the tray; and wherein any resulting plant or plants produced from one or more cuttings, plants, or seeds or combinations thereof placed in the tray develops air pruned roots that are air pruned at the interface of the drainage openings such that the resulting plant or plants are not bound to the tray by its roots and wherein the rounded corner facilitates the resulting plant or plants with medium to be removed as a group.

3. The planting of claim 2, wherein said planting is comprised of rooted or unrooted cuttings.

4. The planting of claim 3, wherein said planting is comprised of the same plant species.

5. The planting of claim 3, wherein said planting is comprised of different plant species.

6. The planting of claim 2, wherein said at least one plant or said at least one seed is comprised of different plant species.

7. The planting of claim 2, wherein said at least one plant or said at least one seed is comprised of the same plant species.

* * * * *